United States Patent
Guschlbauer et al.

(10) Patent No.: US 12,463,460 B2
(45) Date of Patent: Nov. 4, 2025

(54) PHOTOVOLTAIC SYSTEM

(71) Applicant: Fronius International GmbH, Pettenbach (AT)

(72) Inventors: Florian Guschlbauer, Pettenbach (AT); Dominik Pfaffenbichler, Pettenbach (AT); Michael Koren, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 306 days.

(21) Appl. No.: 18/246,615

(22) PCT Filed: Sep. 28, 2021

(86) PCT No.: PCT/EP2021/076656
§ 371 (c)(1),
(2) Date: Mar. 24, 2023

(87) PCT Pub. No.: WO2022/073804
PCT Pub. Date: Apr. 14, 2022

(65) Prior Publication Data
US 2025/0183710 A1 Jun. 5, 2025

(51) Int. Cl.
*H02J 13/00* (2006.01)
*H02J 3/00* (2006.01)
*H02J 3/38* (2006.01)

(52) U.S. Cl.
CPC ........ *H02J 13/00007* (2020.01); *H02J 3/001* (2020.01); *H02J 3/0073* (2020.01); *H02J 3/38* (2013.01); *H02J 2300/24* (2020.01)

(58) Field of Classification Search
CPC .... H02J 13/00007; H02J 3/001; H02J 3/0073; H02J 3/38; H02J 2300/24
See application file for complete search history.

(56) References Cited

U.S. PATENT DOCUMENTS

| | | | |
|---|---|---|---|
| 2017/0012428 A1* | 1/2017 | Nakayama | H02J 7/35 |
| 2017/0229868 A1* | 8/2017 | Laval | H02J 3/0073 |

(Continued)

FOREIGN PATENT DOCUMENTS

| | | |
|---|---|---|
| CN | 109638795 A | 4/2019 |
| CN | 110661295 A | 1/2020 |
| WO | 2015/120729 A1 | 8/2015 |

OTHER PUBLICATIONS

International Search Report corresponding to PCT Application No. PCT/EP2021/076656, mailed Dec. 22, 2021 (English language document) (4 pages).

(Continued)

*Primary Examiner* — Carlos Amaya
(74) *Attorney, Agent, or Firm* — Maginot, Moore & Beck

(57) ABSTRACT

A photovoltaic system (1) includes an inverter unit (2) adapted to convert an electrical direct current (DC) power generated by photovoltaic modules (3) into an electrical alternating current (AC) power supplied via AC lines (5), and a smart meter (8) connected to a power supply grid PSG (11). The system further include an emergency unit (6) having a controller (6A) adapted: a) to open an emergency switch (7) to automatically disconnect the photovoltaic system (1) from the power supply grid PSG (11) if a power supply grid failure is detected; and b) to notify a current switching state of the emergency switch (7) by means of power line communication (PLC) communication via the AC lines (5) to a controller of the inverter unit (2).

20 Claims, 2 Drawing Sheets

(56) References Cited

U.S. PATENT DOCUMENTS

2018/0013292 A1    1/2018  White et al.
2019/0020218 A1*  1/2019  Okada .................. H02J 7/0068

OTHER PUBLICATIONS

Han et al., "PLC-Based Photovoltaic System Management for Smart Home Energy Management System," IEEE Transactions on Consumer Electronics, IEEE Service Center, May 1, 2014 (May 1, 2014), pp. 184-189, vol. 60, No. 2; XP011553922; ISSN: 0098-3063; DOI: 10.1109/TCE.2014.6851992.

EP Search Report corresponding to EP 20200133.5, dated Mar. 1, 2021 (3 pages).

* cited by examiner

PHOTOVOLTAIC SYSTEM

BACKGROUND

The invention relates to a photovoltaic system and in particular to a photovoltaic system for facilitating power management during an emergency situation using powerline communication.

A photovoltaic system comprises photovoltaic modules which generate direct current (DC) power from solar radiation due to photovoltaic effect. The photovoltaic system comprises an inverter unit which transforms the DC power received from the photovoltaic modules into an alternating current (AC) power. The inverter may directly supply the AC power to the power supply grid (PSG). The AC power generated by the inverter unit also can either be used to provide a power supply for electrical loads locally or can also be fed into the PSG to be used elsewhere. Further, the photovoltaic system comprises an electric meter device to measure an amount of energy that passes through it to a public PSG.

In case of a power failure of the PSG, a communication is necessary between the inverter unit and the PSG to inform a controller of the inverter unit of the photovoltaic system about the occurred power failure of the PSG. This communication is performed via a dedicated communication cable where the necessary notification is transmitted from the electric meter device of the photovoltaic system connected to the PSG to the inverter unit. A conventional photovoltaic system comprises separate dedicated cables which act a communication line and a power line between the PSG and the inverter. In case of a failure of the PSG, the dedicated communication line is used to exchange information between the inverter and the PSG about switching between a normal operating mode and a full backup emergency mode. During the normal operating mode, the PSG supplies electrical power to the load network. During the full backup emergency mode, the inverter supplies electrical power to the load network.

SUMMARY OF THE DISCLOSURE

Accordingly, it is an object of the present invention to provide a photovoltaic system where communication of information between PSG and the inverter takes place over the power line without installing additional wires or cables dedicated to the communication line such that a simplified solution for switching between the normal operating mode and the full backup emergency mode is provided. Omission of dedicated communication line between the PSG and the inverter for cost effective and reliable real-time solution for switching between the normal operating mode and the full backup emergency mode is thus provided.

This object is achieved according to a first aspect of the present invention by a photovoltaic system comprising the features of claim 1.

The invention provides according to a first aspect a photovoltaic system comprising an inverter unit adapted to convert an electrical direct current (DC) power generated by photovoltaic modules into an electrical alternating current (AC) power supplied via AC lines and a smart meter of the photovoltaic system to a power supply grid wherein the photovoltaic system is characterized in that it comprises an emergency unit having a controller adapted to open an emergency switch to automatically disconnect the photovoltaic system from the power supply grid if a power supply grid failure is detected and which is adapted to notify a current switching state of the emergency switch by means of power line communication PLC via the AC lines to a controller of the inverter unit.

Accordingly, in the photovoltaic system according to the present invention, a notification of the switching state of the emergency switch is performed by powerline communication PLC via the local AC lines of the photovoltaic system.

A further advantage of the photovoltaic system according to the first aspect of the present invention resides in that the communication can be performed via the already existing AC lines so that no dedicated additional communication lines are required that have to be provided within the local photovoltaic system.

This makes the photovoltaic system even more robust and reduces the cabling efforts when setting up the photovoltaic system.

In a possible embodiment of the photovoltaic system according to the first aspect of the present invention, the failure of the power supply grid is detected by the controller of the emergency unit and/or by the controller of the inverter unit on the basis of smart meter data provided by the smart meter of the photovoltaic system via PLC communication. The smart meter data can be transmitted via PLC communication from the emergency unit to the inverter unit of the photovoltaic system.

In a further possible embodiment of the photovoltaic system according to the first aspect of the present invention, a load network of the photovoltaic system is connected to the AC lines of the photovoltaic system.

In a possible embodiment of the photovoltaic system according to the first aspect of the present invention, in a normal operation mode of the photovoltaic system, the electrical loads of the load network are supplied with AC power by the power supply grid via the closed emergency switch.

In a further possible embodiment of the photovoltaic system according to the first aspect of the present invention, in an emergency operation mode of the photovoltaic system being disconnected from the power supply grid by the open emergency switch, the electrical loads of the load network are supplied with AC power by the inverter unit of the photovoltaic system.

In a further possible embodiment of the photovoltaic system according to the first aspect of the present invention, the emergency unit comprises a PLC transceiver adapted to communicate with a PLC transceiver of the inverter unit via the AC lines of the photovoltaic system.

In a further possible embodiment of the photovoltaic system according to the first aspect of the present invention, the inverter unit is connected to a storage unit of the photovoltaic system.

In a further possible embodiment of the photovoltaic system according to the first aspect of the present invention, in the emergency operation mode of the photovoltaic system, the controller and the PLC transceiver of the inverter unit are supplied with electrical DC power by the photovoltaic modules and/or by the storage unit of the photovoltaic system.

In a still further possible embodiment of the photovoltaic system according to the first aspect of the present invention, the emergency unit comprises a buffer storage unit adapted to supply the controller and the PLC transceiver of the emergency unit with electrical DC power in the emergency operation mode of the photovoltaic system.

In a still further possible embodiment of the photovoltaic system according to the first aspect of the present invention, if the smart meter data indicate an end of the power supply grid failure, the controller of the emergency unit is adapted to close the emergency switch to automatically reconnect the photovoltaic system to the power supply grid.

In a still further possible embodiment of the photovoltaic system according to the first aspect of the present invention, the controller of the inverter unit is adapted to start the emergency operation mode in response to an open switching state notification of the emergency switch received from the emergency unit and to stop the emergency operation mode in response to a closed switching state notification of the emergency switch received from the emergency unit.

In a still further possible embodiment of the photovoltaic system according to the first aspect of the present invention, the emergency unit and the inverter unit comprise local network addresses used to establish a bidirectional PLC communication between the emergency unit and the inverter unit via the AC lines of the photovoltaic system.

Accordingly, even in an emergency state, the communication between the inverter unit and the emergency unit is maintained because the entities can communicate with each other using predefined local network addresses without requiring a router-based IP address assignment.

In a further possible embodiment of the photovoltaic system according to the first aspect of the present invention, the smart meter is integrated in the emergency unit.

In a further possible alternative embodiment of the photovoltaic system according to the first aspect of the present invention, the smart meter is connected via a data cable to a data interface of the emergency unit.

In a still further possible embodiment of the photovoltaic system according to the first aspect of the present invention, the controller of the emergency unit and/or the controller of the inverter unit are adapted to perform an energy management of the electrical AC power consumed by the loads of the load network, the DC power generated by the photovoltaic modules and the DC power stored in the storage unit of the photovoltaic system.

In a further possible embodiment of the photovoltaic system according to the first aspect of the present invention, the smart meter data provided by the smart meter comprises a voltage, an electrical current and/or a frequency for all current phases L of the power supply grid.

The invention further provides according to a second aspect an emergency unit comprising the features of claim 14.

The invention provides according to the second aspect an emergency unit for a photovoltaic system according to the first aspect of the present invention wherein the emergency unit comprises:
  a controller adapted to control an emergency switch to connect the photovoltaic system in a normal operation mode with the power supply grid and to disconnect the photovoltaic system in an emergency operation mode from the power supply grid and comprising
  a PLC transceiver adapted to establish a PLC communication with a controller of an inverter unit of the photovoltaic system via AC lines of the photovoltaic system.

BRIEF DESCRIPTION OF THE DRAWINGS

In the following, possible embodiments of the different aspects of the present invention are described in more detail with reference to the enclosed figures.

DETAILED DESCRIPTION

Figure 1:
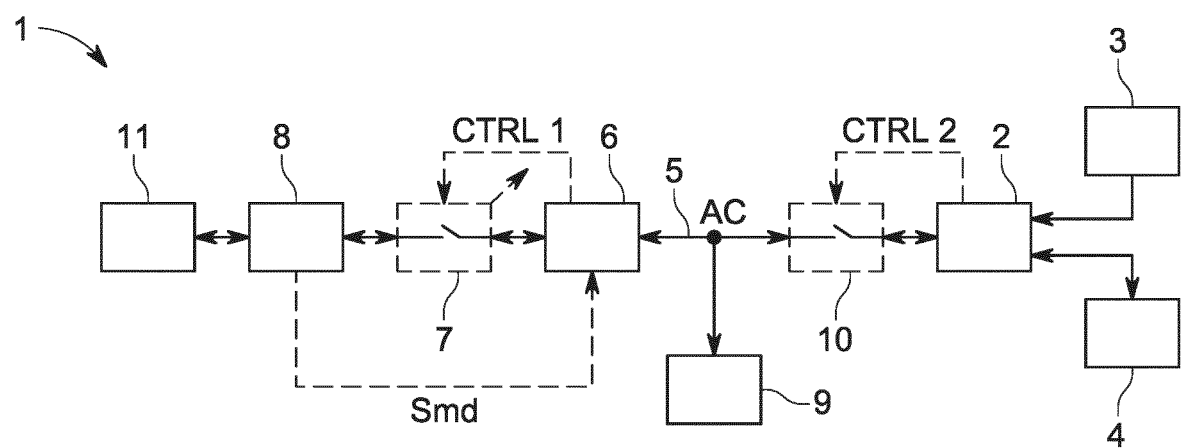
FIG. 1 shows a block diagram of a possible exemplary embodiment of a photovoltaic system according to a first aspect of the present invention.

As can be seen from the block diagram in FIG. 1, a photovoltaic system 1 according to a first aspect of the present invention in the illustrated embodiment comprises an inverter unit 2 adapted to convert an electrical direct current, DC, power generated by photovoltaic modules 3 into an electrical alternating current, AC, power. The inverter unit 2 can in a possible embodiment also be connected to a local energy storage unit 4 of the photovoltaic system 1 which is adapted to store electrical energy. The inverter unit 2 is connected to an emergency unit 6 and at least one load network 9 via local AC lines 5 of the photovoltaic system 1. The emergency unit 6 is further connected to an emergency switch 7 via, for example, AC cables. In an embodiment, the emergency switch 7 is integrated with the emergency unit 6 as a single unit. In another embodiment, the emergency switch 7 and the emergency unit 6 are two separate units connected via, for example, a control cable such as YM-J. In another embodiment, the emergency switch 7, the emergency unit 6 and the smart meter 8 are integrated as a single unit.

Further, as shown in the block diagram in FIG. 1, the emergency switch 7 is connected to a smart meter 8. The smart meter 8 is connected to the PSG 11.

Thus, the inverter unit 2 supplies the AC power to a power supply grid PSG 11 via the emergency unit 6, the emergency switch 7 and the smart meter 8, as shown in the block diagram of FIG. 1.

The smart meter 8 is an electrical meter which can be provided to measure parameters of the PSG 11 and to provide a controller of the inverter unit 2 with smart meter data, smd. For example, the smd is a voltage value, a current value, frequency details, energy details associated with the PSG 11, etc. In an example, the smart meter 8 is a measurement device to measure electrical parameters of the PSG 11 and/or electrical power flowing to/from the PSG 11.

Figure 2:
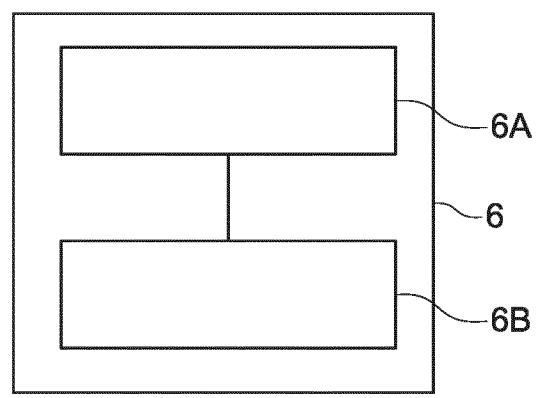
FIG. 2 shows a block diagram of a possible exemplary embodiment of an emergency unit of the photovoltaic system according to a further second aspect of the present invention.

As shown in FIG. 2, the emergency unit 6 comprises a controller 6A which is adapted to open the emergency switch 7 to automatically disconnect the photovoltaic system 1 from the PSG 11 if a power supply grid failure is detected. The controller 6A is further adapted to notify a current switching state of the emergency switch 7 by means of powerline communication PLC via the AC lines 5 to a controller of the inverter unit 2. The controller of the inverter unit 2 is not explicitly shown in FIG. 1.

A failure of the PSG 11 is detected by the controller 6A of the emergency unit 6 and/or by the controller of the inverter unit 2 on the basis of smart meter data smd provided by the smart meter 8 of the photovoltaic system 1. In a possible implementation, the smart meter data smd can be transmitted via a powerline communication PLC from the controller 6A of the emergency unit 6 via the PLC Transceiver Unit 6B (as shown in FIG. 2) to the controller of the inverter unit 2. The load network 9 of the photovoltaic system 1 is connected to the AC lines 5 of the photovoltaic system 1.

In a normal operation mode of the photovoltaic system 1, the electrical loads of the load network 9 are connected to AC power by the external PSG 11 via the closed emergency switch 7. The loads of the load network 9 are supplied with AC power by either the photovoltaic modules 3 or the PSG 11. In contrast, in an emergency operation mode of the photovoltaic system 1, the emergency switch 7 is in an open state. The PSG 11 is disconnected and this causes the switch 7 to move from a closed state to an open state. Being disconnected from the external PSG 11 by the switched-off and thus open emergency switch 7, the electrical loads of the load network 9 are supplied with AC power by the inverter unit 2 of the photovoltaic system 1.

The emergency unit 6 comprises in a preferred embodiment, a PLC transceiver adapted to communicate bi-directionally with a PLC transceiver of the inverter unit 2 via the local AC lines 5 of the photovoltaic system 1.

In the emergency operation mode of the photovoltaic system 1, the controller and the PLC transceiver of the inverter unit 2 are both supplied with electrical power by the photovoltaic modules 3 and/or by the local storage unit 4 of the photovoltaic system 1. Further, the emergency unit 6 can also comprise a buffer storage unit which is adapted to supply the controller 6A and the PLC transceiver of the emergency unit 6 with electrical power during the emergency operation mode of the photovoltaic system 1.

If the smart meter data smd provided by the smart meter 8 indicate an end of the power supply grid failure, the controller 6A of the emergency unit 6 is adapted to close automatically the emergency switch 7 to reconnect the photovoltaic system 1 to the external power supply grid PSG 11. The emergency unit 6 can control the emergency switch 7 by a control signal CTRL 1 as shown in FIG. 1. The controller 6A of the emergency unit 6 can switch the emergency switch 7 on or off depending on the operation mode of the photovoltaic system 1. The dashed lines in FIG. 1 shows the signal paths in the system 1.

The controller of the inverter unit 2 is adapted to start the emergency operation mode in response to an open switching state notification received from the controller 6A of the emergency unit 6. The open switching state notification indicates that the emergency switch 7 is in an emergency switch state. The open switching state notification can be communicated by means of PLC communication via the AC lines 5. The controller of the inverter unit 2 can stop the emergency operation mode in response to a closed switching state notification received from the controller 6A of the emergency unit 6.

In a preferred embodiment, both the emergency unit 6 and the inverter unit 2 comprise assigned local network addresses used to establish the bidirectional PLC communication between the emergency unit 6 and the inverter unit 2 via the AC lines 5 of the photovoltaic system 1. In the illustrated embodiment of FIG. 1, the smart meter 8 and the emergency unit 6 form separate entities of the photovoltaic system 1. In an alternative embodiment, the smart meter 8 can also be integrated in the emergency unit 6. In the illustrated embodiment of FIG. 1, the smart meter 8 can be connected via a data cable or a local area network LAN to a data interface of the emergency unit 6 to supply smart meter data smd. The smart meter data smd provided by the smart meter 8 can comprise in a possible implementation, data relating to a voltage U, an electrical current I and/or a frequency f for all current phases L of the power supply grid PSG 11. For example, the smart meter calculates an active power, a reactive power, an apparent power, a power factor, a phase shift, etc., from the measured data.

In a possible embodiment of the photovoltaic system 1 according to the first aspect of the present invention, the controller 6A of the emergency unit 6 and/or the controller of the inverter unit 2 are adapted to perform an energy management of the electrical AC power consumed by the loads of the load network 9, the DC power generated by the photovoltaic modules 3 and the DC power stored in the storage unit 4 of the photovoltaic system 1.

In the illustrated embodiment of FIG. 1, the controller of the inverter unit 2 can also control a further switch 10 provided within the AC lines 5 of the photovoltaic system 1. For instance, depending on the country and the effective norms, the switch 7 can be a 3-terminal switch or a 4 terminal switch. In case the switch 7 is a 3-terminal switch, then switch 10 is not a necessary part of the system 1. In an embodiment, the switch 10 is integrated with the inverter unit 2 as a single unit.

In case the switch 7 is a 4-terminal switch, and there is a disconnection of a 4 terminal switch from the PSG 11, then the switch 10 acts as a connection between earth (P) and neutral wire (N). This connection between the neutral wire and the earth is necessary for any residual current monitoring unit (RCMU) to operate again. The connection between neutral wire and earth will thus be close to the source of power, which in case of an emergency operation is the inverter unit 2. The inverter unit 2, thus, controls the switch 10 via the control signal CTRL 2.

In the photovoltaic system 1 as illustrated in the embodiment of FIG. 1, the controller of the inverter unit 2 is in communication with the controller 6A of the emergency unit 6 by means of PLC communication. The emergency unit 6 can be either integrated into the smart meter 8 or can form a standalone device connected to the smart meter 8, e.g. by means of a data cable. The smart meter 8 can generate status data indicating a current state of the power supply grid PSG 11 and can provide corresponding smart meter data smd to the controller 6A of the emergency unit 6.

In a normal operation mode, for example, the smart meter 8 can acquire a grid-on status of the power supply grid PSG 11 and can transmit this status to the controller 6A of the emergency unit 6. The emergency unit 6 can transmit the received grid-on status as well as additional smart meter data smd to the controller of the inverter unit 2. The controller of the inverter unit 2 can inform the controller 6A of the emergency unit 6 to keep the emergency switch 7 in a closed switching state. Accordingly, the controller 6A of the emergency unit 6 then controls in the normal operation mode the emergency switch 7 such that it is in a closed switching state. The controller 6A of the emergency unit 6 can inform the controller of the inverter unit 2 about the grid-on status of the power supply grid PSG 11 via the AC power lines 5 of the photovoltaic system 1. Accordingly, in the normal operation mode, the power supply grid PSG 11 supplies electrical power via the closed emergency switch 7 to the load network 9 of the photovoltaic system 1. In an embodiment, in the normal operation mode, the PSG 11 receives electrical power from the photovoltaic modules 3.

In contrast, if the power supply grid PSG 11 is off, the smart meter 8 stops transmitting the grid-on status to the controller 6A of the emergency unit 6. As a consequence, the controller 6A of the emergency unit 6 switches the emergency switch 7 into an open switch state. Further, the controller 6A of the emergency unit 6 transmits the grid-off status to the controller of the inverter unit 2. The controller of the inverter unit 2 informs the controller 6A of the emergency unit 6 to retain the emergency switch 7 in the open switch state. The emergency switch 7 is now locked in the open switching state by the controller 6A of the emergency unit 6. The controller of the inverter unit 2 controls the inverter unit 2 to start supplying an AC power supply to the local load network 9 of the photovoltaic system 1.

Further, if the power supply grid PSG 11 is on again, that is, if there is no longer a power supply grid failure, the smart meter 8 can receive in a possible embodiment a grid-on status from the power supply grid PSG 11. The smart meter 8 can transmit the power supply grid-on status to the controller 6A of the emergency unit 6. The controller 6A of the emergency unit 6 then transmits the grid-on status as well as additional smart meter data smd to the controller of the inverter unit 2.

The controller of the inverter unit 2 in turn informs the controller 6A of the emergency unit 6 to continue to keep the emergency switch 7 in the open state for a predefined time. The controller 6A of the emergency unit 6 continues to keep the emergency switch 7 in the open state for the indicated predefined time. This time can be defined by the controller of the inverter unit 2. In a possible embodiment, the controller 6A of the emergency unit 6 can continue the check for the grid-on status signal from the smart meter 8 and further in a possible implementation, the grid values can also be considered by the controller of the inverter unit 2. At the end of the predefined time, the controller 6A of the emergency unit 6 switches the emergency switch 7 to the closed state. The power supply grid PSG 11 now supplies AC power via the closed emergency switch 7 to the local load network 9 again. The inverter unit 2 stops supplying AC power to the load network 9.

The block diagram of FIG. 2 illustrates a possible embodiment of the emergency unit 6 according to the second aspect of the present invention. The emergency unit 6 comprises in the illustrated embodiment a controller 6A and a PLC transceiver 6B. The controller 6A is adapted to control an emergency switch 7 of the photovoltaic system 1 to connect the photovoltaic system 1 in a normal operation mode with the power supply grid PSG 11 and to disconnect the photovoltaic system 1 in an emergency operation mode from the power supply grid PSG 11. The PLC transceiver 6B is adapted to establish a PLC communication with the controller of the inverter unit 2 of the photovoltaic system 1 via AC lines 5 of the photovoltaic system 1.

Figure 3:
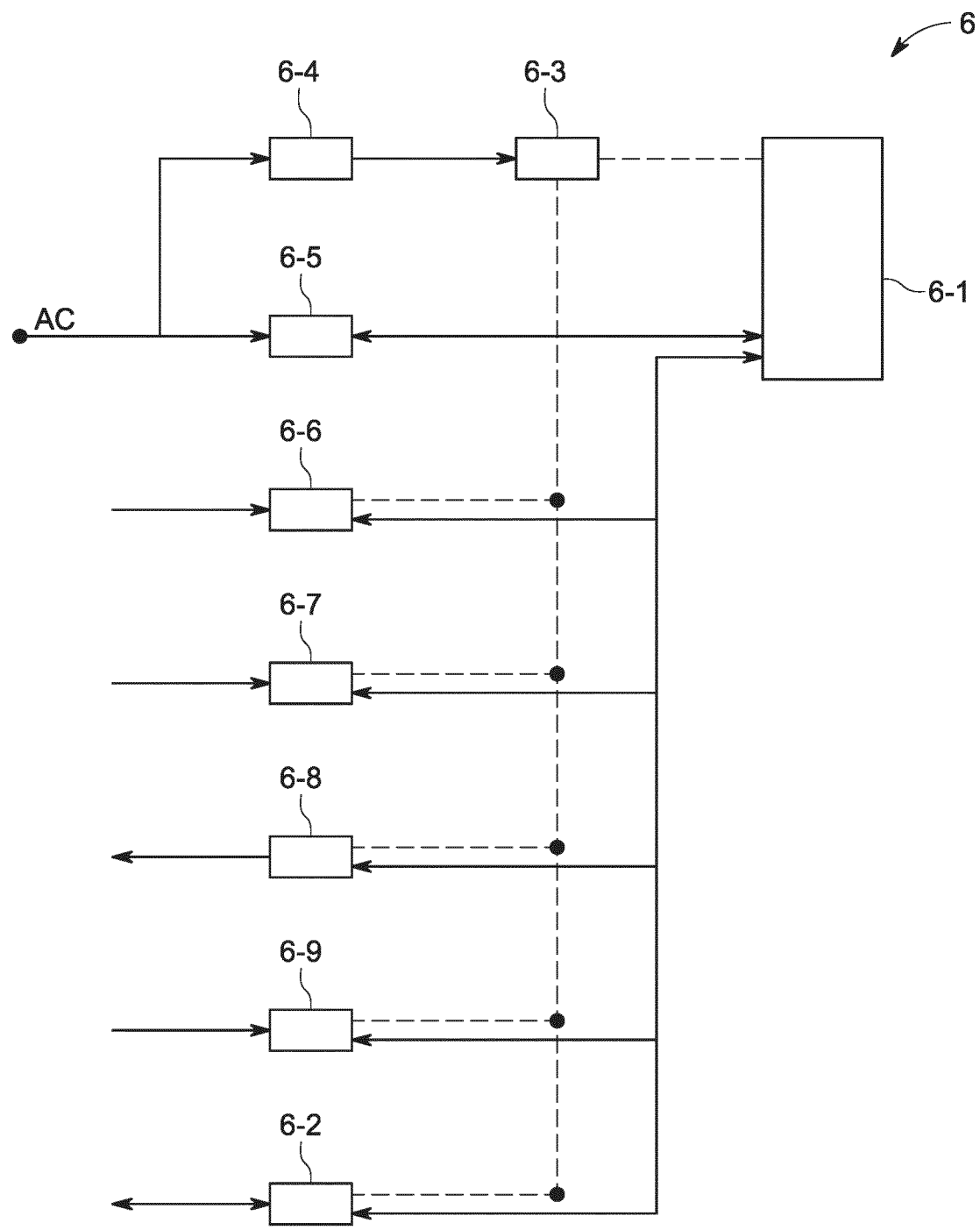
FIG. 3 shows a diagram for illustrating a possible exemplary embodiment of an emergency unit of the photovoltaic system according to the second aspect of the present invention.

FIG. 3 illustrates a further possible exemplary implementation of an emergency unit 6 according to the second aspect of the present invention. As can be seen from the diagram of FIG. 3, the emergency unit 6 can comprise different interfaces. In the illustrated embodiment, the emergency unit 6 comprises a system-on-chip (SoC) primary controller 6-1 which may communicate with a secondary microcontroller 6-2 for higher loads. In the illustrated embodiment, the emergency unit 6 comprises a buffer storage unit 6-3 adapted to supply the controllers 6-1, 6-2 and other entities of the emergency unit 6 with electrical power (dashed lines) in an emergency operation mode of the photovoltaic system 1. The emergency unit 6 comprises an interface to the AC power lines 5 to receive AC power which may be converted by a power supply transformation entity 6-4 to provide DC power for recharging the local buffer storage unit 6-3. Further, the PLC transceiver 6-5 can be connected to the AC lines 5 as illustrated in FIG. 3. In a possible implementation, the emergency unit 6 further comprises an interface to the smart meter 8. In the illustrated embodiment, the emergency unit 6 comprises a data interface for a local area network 6-6 and for an RS485 data cable 6-7. Further possible interfaces can be CAN, RS232, EEBus, Modbus, KNX Bus, TCP/IP, Modbus TCP, etc. However, it is to be noted that the possible interfaces are not limited to the explicitly described interfaces and can be modified based on the application and usage of the photovoltaic system 1. The emergency unit 6 further comprises an interface with the emergency switch 7. In the illustrated embodiment, the emergency unit 6 comprises a solid state relay SSR 6-8 to output a switch-on/switch-off control signal CTRL 1 for switching the emergency switch 7 between an on-switching state and an off-switching state. Further, the emergency unit 6 can comprise in a possible implementation a feedback interface 6-9 receiving a feedback about the switching state of the emergency switch 7.

The secondary controller 6-2 can be connected to external entities or devices such as a heat pump or external relays (GPIOs). The primary controller 6-1 which may be formed by a system-on-chip can comprise a local data memory. In a possible implementation, the primary controller 6-1 and the secondary controller 6-2 of the emergency unit 6 are both integrated in a control unit of the emergency unit 6.

In a possible implementation of the photovoltaic system 1 and of the emergency unit 6 according to the present invention, the communication between the controllers by means of PLC can comprise different levels of priority. A higher communication priority level includes the communication between the inverter unit 2 and the emergency unit 6 providing the emergency operation mode functionality of the photovoltaic system 1. Further, communication between the emergency unit 6 and the smart meter 8, in particular the transmission of the smart meter data smd, can comprise a high priority. The buffer battery 6-3 may comprise a high priority PLC communication in a backup mode. Communication concerning energy management via the I/O or RS485 has in a possible implementation a lower priority.

The AC lines 5 illustrated in FIG. 1 comprise one or more power supply lines L. In a preferred embodiment, the AC lines 5 comprise three power supply lines for the different phases L1, L2, L3 as well as a P- and N-conductor.

The invention claimed is:

1. A photovoltaic system, comprising:
   an inverter unit having a controller and being adapted to convert an electrical direct current (DC) power generated by photovoltaic modules into an electrical alternating current, AC, power;
   a smart meter configured to supply the alternating current (AC) power to a power supply grid; and
   an emergency unit connected to the inverter via AC lines and to the smart meter via an emergency switch, the emergency unit having a controller adapted to:
      open the emergency switch to automatically disconnect the photovoltaic system from the power supply grid if a power supply grid failure is detected, and
      notify a current switching state of the emergency switch by means of power line communication, PLC, via the AC lines to the controller of the inverter unit;
   in a normal operation mode of the photovoltaic system, the emergency switch is being in a closed state,
   in an emergency operation mode of the photovoltaic system, the emergency switch is being in an open state to disconnect the photovoltaic system from the power supply grid, and
   the controller of the inverter unit is being adapted to start the emergency operation mode in response to an open switching state notification received from the controller of the emergency unit, wherein the emergency unit comprises a buffer storage unit adapted to supply the controller and the PLC transceiver of the emergency unit with electrical DC power in the emergency operation mode of the photovoltaic system.

2. The photovoltaic system of claim 1 wherein a failure of the power supply grid is detected by at least one of the controller of the emergency unit and the controller of the inverter unit on the basis of smart meter data provided by the smart meter of the photovoltaic system via PLC communication.

3. The photovoltaic system of claim 1 wherein a load network of the photovoltaic system is connected to the AC lines of the photovoltaic system,
   in a normal operation mode of the photovoltaic system, the electrical loads of the load network being supplied with AC power by the power supply grid via the closed emergency switch, and
   in an emergency operation mode of the photovoltaic system being disconnected from the power supply grid by the open emergency switch, the electrical loads of the load network being supplied with AC power by the inverter unit of the photovoltaic system.

4. The photovoltaic system of claim 1, wherein the emergency unit comprises a PLC transceiver adapted to communicate with a PLC transceiver of the inverter unit via the AC lines of the photovoltaic system.

5. The photovoltaic system of claim 1 wherein;
   the inverter unit is connected to a storage unit of the photovoltaic system, and
   in the emergency operation mode of the photovoltaic system, the controller and the PLC transceiver of the inverter unit are supplied with electrical DC power by at least one of the photovoltaic modules and the storage unit of the photovoltaic system.

6. The photovoltaic system of claim 2 wherein, if the smart meter data indicate an end of the power supply grid failure, the controller of the emergency unit is adapted to close the emergency switch to automatically reconnect the photovoltaic system to the power supply grid.

7. The photovoltaic system of claim 6 wherein, if the smart meter data indicate an end of the power supply grid failure, the controller of the inverter unit is adapted to inform the controller of the emergency unit to continue to keep the emergency switch in the open state for a predefined time, and wherein the controller of the emergency unit is adapted to switch the emergency switch to the closed state at the end of the predefined time.

8. The photovoltaic system of claim 1 wherein the controller of the inverter unit is adapted to stop the emergency operation mode in response to a closed switching state notification of the emergency switch received from the emergency unit.

9. The photovoltaic system of claim 1 wherein the smart meter is integrated in the emergency unit or is connected via a data cable to a data interface of the emergency unit.

10. The photovoltaic system of claim 5 wherein the controller of the emergency unit and/or the controller of the inverter unit are adapted to perform an energy management of the electrical AC power consumed by the loads of the load network, the DC power generated by the photovoltaic modules and the DC power stored in the storage unit of the photovoltaic system.

11. An emergency unit for a photovoltaic system of claim 1, the emergency unit comprising:
   a controller adapted to control an emergency switch to connect the photovoltaic system in a normal operation mode with the power supply grid and to disconnect the photovoltaic system in an emergency operation mode from the power supply grid; and
   a PLC transceiver adapted to establish a PLC communication with a controller of an inverter unit of the photovoltaic system via AC lines of the photovoltaic system.

12. A photovoltaic system, comprising:
   an inverter unit having a controller and being adapted to convert an electrical direct current power generated by photovoltaic modules into an electrical alternating current, AC, power;
   a smart meter configured to supply the alternating current power to a power supply grid; and
   an emergency unit connected to the inverter via AC lines and to the smart meter via an emergency switch, the emergency unit having a controller adapted to;
      open the emergency switch to automatically disconnect the photovoltaic system from the power supply grid if a power supply grid failure is detected, and
      notify a current switching state of the emergency switch by means of power line communication, PLC, via the AC lines to the controller of the inverter unit,
   in a normal operation mode of the photovoltaic system, the emergency switch being in a closed state,
   in an emergency operation mode of the photovoltaic system, the emergency switch being in an open state to disconnect the photovoltaic system from the power supply grid,
   the controller of the inverter unit being adapted to start the emergency operation mode in response to an open switching state notification received from the controller of the emergency unit,
   a failure of the power supply grid being detected by at least one of the controller of the emergency unit and the controller of the inverter unit on the basis of smart meter data provided by the smart meter of the photovoltaic system via PLC communication,
   the controller of the inverter unit being adapted to inform the controller of the emergency unit to continue to keep the emergency switch in the open state for a predefined time if the smart meter data indicate an end of the power supply grid failure, and to switch the emergency switch to the closed state at the end of the predefined time.

13. The photovoltaic system of claim 12 wherein a load network of the photovoltaic system is connected to the AC lines of the photovoltaic system,
   in a normal operation mode of the photovoltaic system, the electrical loads of the load network being supplied with AC power by the power supply grid via the closed emergency switch, and
   in an emergency operation mode of the photovoltaic system being disconnected from the power supply grid by the open emergency switch, the electrical loads of the load network being supplied with AC power by the inverter unit of the photovoltaic system.

14. The photovoltaic system of claim 12 wherein the emergency unit comprises a PLC transceiver adapted to communicate with a PLC transceiver of the inverter unit via the AC lines of the photovoltaic system.

15. The photovoltaic system of claim 12 wherein the inverter unit is connected to a storage unit of the photovoltaic system and wherein in the emergency operation mode of the photovoltaic system, the controller and the PLC transceiver of the inverter unit are supplied with electrical DC power by at least one of the photovoltaic modules and the storage unit of the photovoltaic system.

16. The photovoltaic system of claim 12 wherein the emergency unit comprises a buffer storage unit adapted to supply the controller and the PLC transceiver of the emergency unit with electrical DC power in the emergency operation mode of the photovoltaic system.

17. The photovoltaic system of claim 12 wherein the controller of the inverter unit is adapted to stop the emergency operation mode in response to a closed switching state notification of the emergency switch received from the emergency unit.

18. The photovoltaic system of claim 12 wherein the smart meter is integrated in the emergency unit or is connected via a data cable to a data interface of the emergency unit.

19. The photovoltaic system of claim 15 wherein the controller of the emergency unit and/or the controller of the inverter unit are adapted to perform an energy management of the electrical AC power consumed by the loads of the load network, the DC power generated by the photovoltaic modules and the DC power stored in the storage unit of the photovoltaic system.

20. An emergency unit for a photovoltaic system of claim 12, the emergency unit comprising:
 a controller adapted to control an emergency switch to connect the photovoltaic system in a normal operation mode with the power supply grid and to disconnect the photovoltaic system in an emergency operation mode from the power supply grid; and
 a PLC transceiver adapted to establish a PLC communication with a controller of an inverter unit of the photovoltaic system via AC lines of the photovoltaic system.

* * * * *